United States Patent
Mazzaro et al.

(10) Patent No.: US 10,018,707 B2
(45) Date of Patent: Jul. 10, 2018

(54) AUTOMATED CANCELLATION OF HARMONICS USING FEED FORWARD FILTER REFLECTION FOR RADAR TRANSMITTER LINEARIZATION

(71) Applicant: The United States of America Army Research Laboratory ATTN: RDRL-LOC-I, Washington, DC (US)

(72) Inventors: Gregory J. Mazzaro, Charleston, SC (US); Kyle A. Gallagher, Derwood, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 468 days.

(21) Appl. No.: 14/703,038

(22) Filed: May 4, 2015

(65) Prior Publication Data
US 2016/0209494 A1   Jul. 21, 2016

Related U.S. Application Data

(60) Provisional application No. 61/987,812, filed on May 2, 2014.

(51) Int. Cl.
*G01S 13/00* (2006.01)
*G01S 7/03* (2006.01)
(Continued)

(52) U.S. Cl.
CPC .............. *G01S 7/032* (2013.01); *G01S 7/038* (2013.01); *G01S 7/282* (2013.01); *G01S 7/35* (2013.01)

(58) Field of Classification Search
CPC .................................. G01S 7/032; G01S 7/038
(Continued)

(56) References Cited

U.S. PATENT DOCUMENTS 8,626,090 B2 * 1/2014 Dalipi .................. H03F 1/3229
375/296
9,258,155 B1 * 2/2016 Riani .................... H04L 1/0061
(Continued)

OTHER PUBLICATIONS

K. A. Gallagher, G. J. Mazzaro, K. D. Sherbondy, R. M. Narayanan, and A. F. Martone, "Automated cancellation of harmonics using feed-forward filter reflection for radar transmitter linearization," Proceedings of the SPIE, vol. 9077, pp. 90770U(1-10), May 2014 (presented at conference in Baltimore, MD on May 5, 2014; published in the SPIE proceedings on May 29, 2014).
(Continued)

*Primary Examiner* — Marcus E Windrich
(74) *Attorney, Agent, or Firm* — Eric Brett Compton (57) ABSTRACT

A novel methodology for automatically linearizing a harmonic radar transmitter—termed Feed-Forward Filter Reflection (FFFR)—is disclosed. The method combines the reflected second harmonic from a filter with the signal passing directly through the filter. The second harmonic from these two paths are combined with equal and opposite amplitudes to reduce the second harmonic beyond filtering alone. This methodology has been experimentally verified at transmit frequencies between 800 and 1000 MHz. Implemented properly, the technique provides greater than 100 dB rejection between 1.6 and 2.0 GHz. Although the tuning has been automated, further optimization is possible. Automated tuning is demonstrated over 400 MHz of bandwidth with a minimum cancellation of 110 dB. One application for the harmonic cancellation is to create a linear radar transmitter for the remote detection of non-linear targets.

14 Claims, 8 Drawing Sheets

(51) Int. Cl.
*G01S 7/282* (2006.01)
*G01S 7/35* (2006.01)

(58) Field of Classification Search
USPC .................................................. 342/175, 200
See application file for complete search history.

(56) References Cited

U.S. PATENT DOCUMENTS

| | | | | |
|---|---|---|---|---|
| 2002/0084845 | A1* | 7/2002 | Eisenberg | H03F 1/3235 330/52 |
| 2004/0192232 | A1* | 9/2004 | Szopko | H04L 31/0475 455/103 |
| 2006/0273952 | A1* | 12/2006 | Krikorian | G01S 7/038 342/198 |
| 2007/0259628 | A1* | 11/2007 | Carmel | H04L 31/0003 455/127.1 |
| 2009/0015465 | A1* | 1/2009 | Kanaya | G01S 7/03 342/200 |
| 2015/0309170 | A1* | 10/2015 | Okimoto | G01S 7/032 342/179 |

OTHER PUBLICATIONS

K. Gallagher, R. Narayanan, G. Mazzaro, K. Sherbondy, "Linearization of a harmonic radar transmitter by feed-forward filter reflection," Proceedings of the IEEE Radar Conference, May 2014. (presented in Cincinnati, OH on May 20, 2014).

Joshua M. Wetherington, and Michael B. Steer, "Robust Analog Canceller for High-Dynamic-Range Radio Frequency Measurement," IEEE Transaction on Microwave Theory and Techniques, vol. 6, No. 6 Jun. 2012, 1709-1719.

Jonathan R. Wilkerson, Kevin G. Gard, and Michael B. Steer, "Automated Broadband High-Dynamic-Range Nonlinear Distortion Measurement System," IEEE Transaction on Microwave Theory and Techniques, vol. 58, No. 5, May 2010, 1273-1282.

* cited by examiner

FIGURE 3. Transmitted and received spectra: $P_{system} > P_{target}$; insufficient transmitter linearization.

AUTOMATED CANCELLATION OF HARMONICS USING FEED FORWARD FILTER REFLECTION FOR RADAR TRANSMITTER LINEARIZATION

RELATED APPLICATION(S)

This application claims the benefit of U.S. Provisional Patent Application No. 61/987,812 filed May 2, 2014, herein incorporated by reference in its entirety for all purposes.

GOVERNMENT SPONSORSHIP

This invention was made with government support under Grant No. W911NF-12-1-0305, awarded by the U.S. Army Research Office. The Government has certain rights in the invention.

BACKGROUND OF THE INVENTION

Field

Embodiments of the present invention are generally directed to radar, and more particularly, to a methodology for automated cancellation of harmonics using feed forward filter reflection for radar transmitted linearization.

Description of Related Art

Harmonic radar exploits harmonically generated returns from nonlinear targets to aid in their detection. The advantage of nonlinear radar over traditional radar is its high clutter rejection, as most naturally-occurring (clutter) materials do not exhibit a nonlinear electromagnetic response under illumination by radio-frequency (RF) energy. The disadvantage of nonlinear radar is that the power-on-target required to generate a signal-to-noise ratio (SNR) comparable to linear radar is much higher than that of linear radar. Nevertheless, nonlinear radar is particularly suited to the detection of man-made electronic devices, typically those containing semiconductors whose radar cross-section is very low owing to their thin geometric profile.

A nonlinear radar tailored to a set of RF electronic responses would help law enforcement agents locate devices whose emissions exceed those permitted by law, allow security personnel to detect unauthorized radio electronics in restricted areas, or enable first-responders to pinpoint personal electronics during emergencies such as immediately after an avalanche or earthquake.

Harmonic radar is a type of nonlinear radar that transmits a single frequency $f_0$ and receives one or more integral multiples of that same frequency (e.g. $2f_0$, $3f_0$, $4f_0$, etc.). The most common harmonic radars receive the lowest harmonic, $2f_0$, because $2f_0$ tends to be the strongest of all harmonics generated by an electronic target for a given transmit frequency and power.

In order to generate a detectable harmonic response from an electronic device, the required power density on dBmW target is approximately $$10 \frac{\text{dBm}W}{\text{cm}^2},$$

which is comparable to the power density observed directly below a cellular base station. Thus, the harmonic radar's transmitter must provide high power to overcome interference by possible cellular towers in the vicinity. Also, typical harmonic responses are received power levels of −100 dBm, and this weak signal must not be masked by harmonics generated by the transmitter that are coupled directly to the receiver. Thus, the harmonic radar's high transmit power must be provided with high linearity.

Basic Harmonic Radar

Figure 1A:
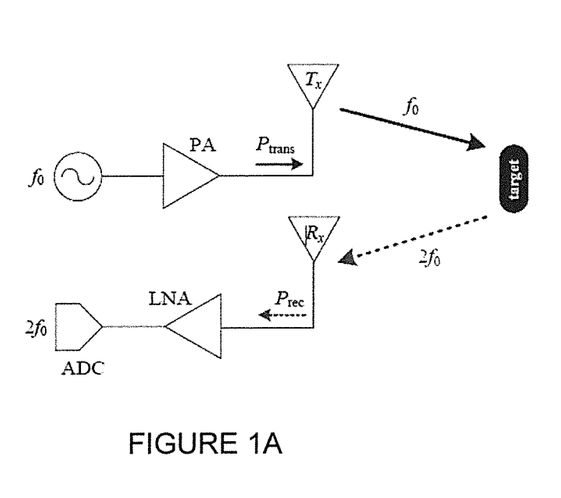
FIG. 1A shows its ideal performance and FIG. 1B show its actual performance.

A simple harmonic radar is shown in FIG. 1A. The transmitter consists of a synthesizer which outputs a single frequency $f_0$, a power amplifier (PA) which boosts the transmit signal to a level suitable for exciting a harmonic response from the target, and a transmit ($T_x$) antenna. The single frequency $f_0$ illuminates the target and the harmonic $2f_0$ radiates from the target back towards the radar. The receiver consists of a receive ($R_x$) antenna, a low-noise amplifier for boosting the received signal to a level suitable for capture, and an analog-to-digital converter (ADC) which records the received signal. Target detection may be performed using this continuous-wave configuration. Ranging may be accomplished by pulsing or otherwise modulating the transmission.

Figure 1B:
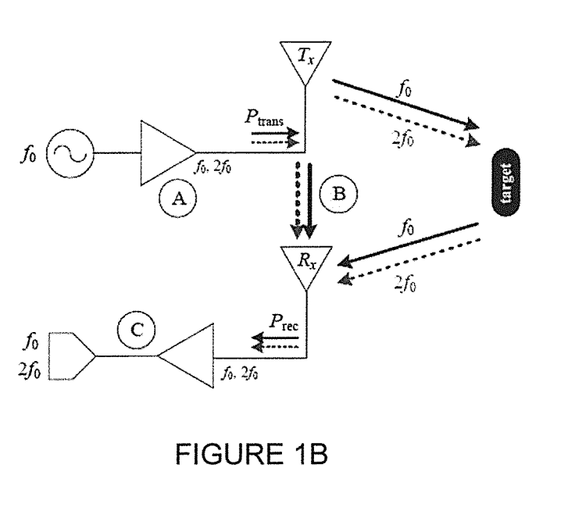

Unfortunately, practical harmonic radar design is not so straightforward, as illustrated in FIG. 1B. Three reasons highlighted below are:

The power amplifier, in addition to boosting the transmitted tone, generates harmonics. If the amplifier-generated harmonic $2f_0$ is not attenuated sufficiently before it arrives at the $T_x$ antenna, this harmonic will be radiated from the transmitter, reflect from the target, and mask the target's harmonic response.

In any practical radar system (linear or nonlinear), coupling exists between the transmitter and the receiver. If this coupling is excessively high, the transmitter-generated $2f_0$ will be fed directly to the receiver and will mask the target's harmonic response.

The target's linear response (at $f_0$, reflected from the target casing) will likely be much stronger than its nonlinear response (at $2f_0$, radiated from the target electronics). Thus, even if the $T_x/R_x$ antenna coupling is minimal, a strong signal at $f_0$ will enter the receiver at the $R_x$ antenna. If this received $f_0$ is not attenuated sufficiently before the low noise amplifier (LNA), the LNA will pass $f_0$ to the ADC (possibly saturating the converter) and/or it will produce its own $2f_0$ to mask the target's harmonic response.

For these highlighted reasons, reduction of the system-generated harmonics, i.e. "linearization" of the radar, is necessary.

Linearized Harmonic Radar

Two popular techniques for RF linearization are filtering and feed-forward cancellation. Filtering removes system-generated harmonics by attenuating or reflecting them at the output of the nonlinearity. Feed-forward cancellation adds a phase-shifted version of the undesired signal to the combined signal in order to remove the undesired signal. The undesired signal may be a harmonic, or it may be a strong linear signal that is likely to generate a harmonic.

Figure 2:
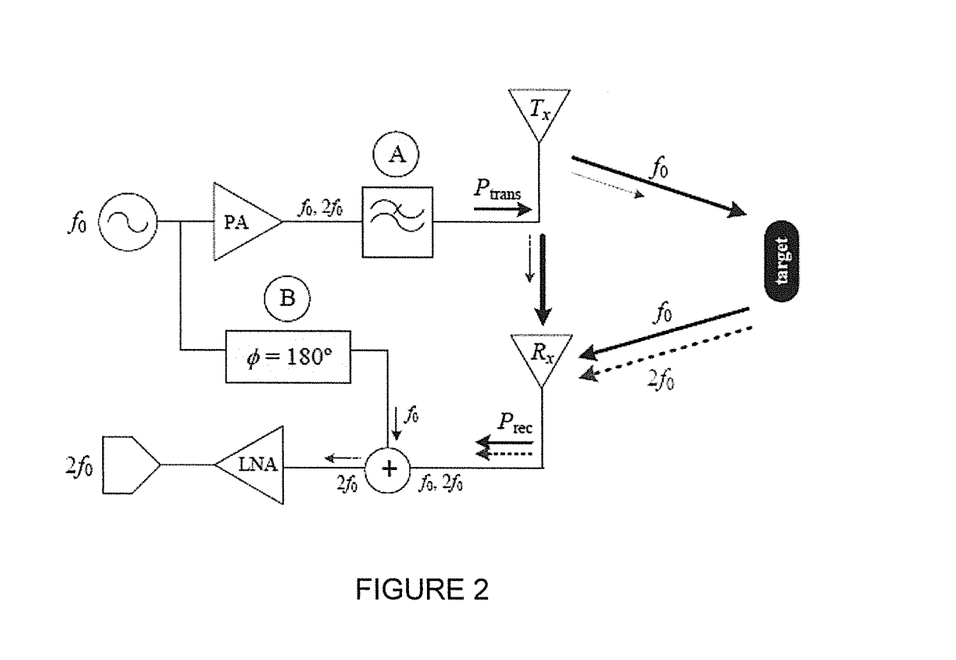
FIG. 2 show a harmonic radar linearized by filtering and feed-forward cancellation.

Filtering may be implemented in the transmitter and/or the receiver. It is depicted in FIG. 2 as part of the transmitter identified as (A). Here, a lowpass filter removes $2f_0$ at the output of the amplifier, which prevents the amplifier-generated $2f_0$ from radiating out of the $T_x$ antenna. Cancellation is usually implemented in the receiver. It is depicted in FIG. 2 identified as (B) inserted at the junction between the $R_x$ antenna and the LNA. A 180° phase-shifted version of $f_0$ is added to the signal received from the $R_x$ antenna, where the signal includes the target response at $f_0$ as well as $2f_0$. The vector sum of the phase-shifted $f_0$ with the un-shifted $f_0$ is ideally zero, ensuring that only $2f_0$ appears at the output of the cancellation circuit and continues along the receiver chain.

Figure 3:
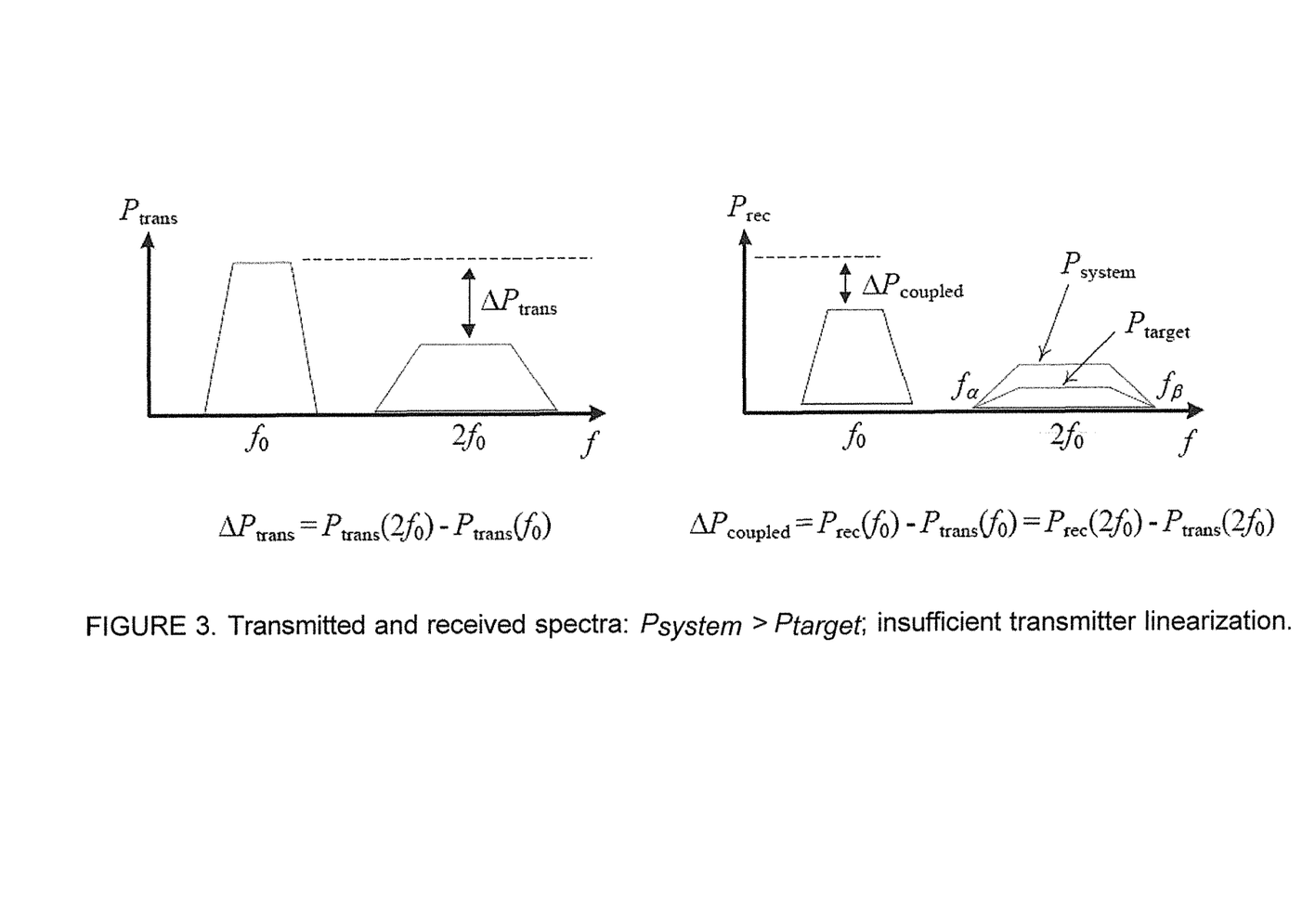
FIG. 3 shows transmitted and received spectra for $P_{system} > P_{target}$ showing insufficient transmitter linearization.

The architecture presented in FIG. 2 is still not an adequate nonlinear target detector for practical standoff ranges between the $T_x/R_x$ antennas and an electronic target. A typical electronic target response, at a distance of 3 m, illuminated by 1 W at 800 MHz from a $T_x$ antenna with a gain of 9 dBi, and received at 1600 MHz from an $R_x$ antenna with a gain of 10 dBi, is approximately $P_{target}$=−90 dBm. For 10 W transmit power and a distance of 20 m, the target response drops to $P_{target}$=−130 dBm. Assume that $P_{trans}$=40 dBm at $f_0$ and that the coupling directly between $P_{trans}$ and $P_{rec}$ (at all frequencies, for simplicity) is $\Delta P_{coupled}$=30 dB. If the amplifier generates $P_{trans}$=−30 dBm at $2f_0$ and if the filter is capable of rejecting $2f_0$ at the output of the amplifier by 60 dB, then the transmitter-generated harmonic that couples directly to the receiver is $$P_{system}(2f_0) = P_{tran.}(2f_0) - |S_{21}^{filter}(2f_0)| - \Delta P_{coupled}(2f_0) \quad (1)$$
$$= -30 \text{ dBm} - 60 \text{ dB} - 30 \text{ dB} = 120 \text{ dBm}$$

which is above the target response ($P_{system}>P_{target}$) by 10 dB, for a distance of 20 m. This scenario is illustrated in FIG. 3, for a finite frequency band $f_\alpha$ to $f_\beta$ over which the target emits a measurable harmonic response. As depicted, the target response at $2f_0$ is masked by the system-generated harmonic distortion at $2f_0$; thus, the target cannot, in theory, be detected.

To reduce the system-generated distortion $P_{system}$ to a level below the target response $P_{target}$, several approaches can be taken:

The rejection provided by the lowpass filter can be increased. The tradeoff is increased passband loss. The signal will need to traverse additional filter elements that will not only increase rejection in the stopband but will also increase loss in the passband. Also, lowpass filtering is a fixed solution that does not allow tuning the circuit to reject particular harmonics (e.g. if $f_0$ and $2f_0$ are not known).

A bandstop filter can be substituted for the lowpass filter. The tradeoff is a periodic pattern in frequency for the passband, which may be undesirable if the receiver is sensitive to high-frequency noise and/or higher harmonics. Like the lowpass filter, the bandstop filter is a fixed-frequency solution.

A tunable lowpass filter may be substituted for the fixed lowpass filter. This solution is still not ideal because tuning is typically accomplished mechanically, which is slow compared to the change-of-frequency required for a practical radar system such as a stepped-frequency radar, electronically, which degrades the linearity of the transmitted signal.

A filter bank may be implemented with electronic switches. However, insertion of switches to select between multiple filters will increase the loss of the overall filtering structure, and/or degrade the linearity of the transmitted signal.

Further improvements would be useful.

BRIEF SUMMARY OF THE INVENTION

Embodiments of the present invention are generally directed to a methodology for automated cancellation of harmonics using feed forward filter reflection for radar transmitted linearization.

According to embodiments, a system is provided for linearizing a harmonic radar transmitter that includes a power amplifier outputting a transmit signal with a transmit frequency and an amplifier-generated harmonic. More particularly, the system comprises a directional coupler in series with an RF filter and a signal combiner with the transmit signal from the power amplifier passes through the directional coupler to the RF filter. The RF filter is configured to reject the amplifier-generated harmonic, such that the amplifier-generated harmonic is reflected back through the coupler in the reverse direction, and the filter passes the transmit frequency and system-generated harmonic to the signal combiner. The reflected amplifier-generated harmonic from the coupler passes through a variable attenuator and a phase shifter, with the variable attenuator configured to reduce the magnitude of the reflected amplifier-generated harmonic to match that of the system-generated harmonic, and the phase shifter configured to cause the reflected amplifier-generated harmonic to be 180 degrees out of phase with the system-generated harmonic, such that the amplifier-generated and system-generated harmonics cancel out at the combiner. The combiner then outputs the transmit frequency without the harmonic to a transmit antenna.

The variable attenuator and phase shifter can be automatically adjusted so that the amplifier-generated and system-generated harmonics cancel out at the combiner. In some embodiments, the system may further include: (i) a radar receiver including a receive antenna coupled configured to a filter to reject the transmit frequency and pass the harmonic; (ii) a fixed attenuator configured to shift the cancellation frequency to cancel different frequencies; (iii) different couplers configured to tune out lower frequencies requiring less attenuation; (iv) an amplifier in series with the phase shifter to configured cancel lower frequencies having less loss through the filter; and/or (v) two vector modulators and an amplifier configured to improve the frequency tuning range on the high and low sides.

According to other embodiments, a system for linearizing a harmonic radar receiver includes: an antenna configured to receive a fundamental transmit frequency and a desired harmonic; a high pass filter coupled to the antenna that is configured to pass the harmonic and reject the fundamental; a directional coupler configured to receive the rejected fundamental and redirect it to a variable attenuator and a phase shifter; and one or more vector modulators configured to control the variable attenuator and a phase shifter to cancel the fundamental transmit frequency via summation with the rejected fundamental.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIG. 1 shows a simple harmonic radar, where

DETAILED DESCRIPTION OF THE INVENTION

This invention resides in a system and methods for automatic linearizing a harmonic radar transmitter. In the preferred embodiments, a transmitter for a harmonic radar transmits $f_0$ and receives only $2f_0$. The solution involves a form of tunable lowpass filter whose passband remains unaltered by tuning but whose deepest stopband rejection (notch) frequency is flexible. The notch frequency corresponds to the harmonic to be received from the target. For this study, the notch is tuned to $2f_0$, but it may also be tuned to a higher harmonic (e.g. $3f_0$, $4f_0$, etc.) whose reception is used for target classification.

Tuning occurs in a low-power branch parallel to the lowpass-filtered signal, which: minimizes signal loss, enables fast, electronic tuning, maintains linearity in the high-power branch. This invention demonstrates the feasibility of electronically tuning such a system.

Feed-Forward Filter Reflection (FFFR)

Figure 4:
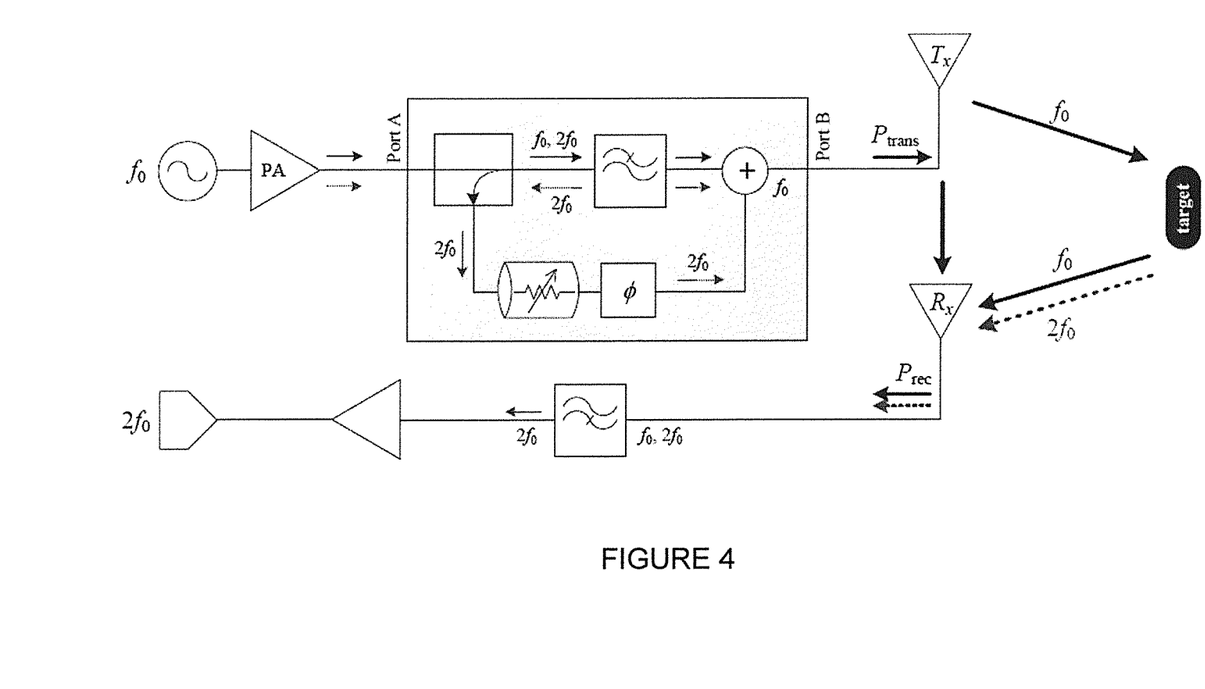
FIG. 4 shows a schematic for harmonic radar with transmitter linearization by feed-forward filter reflection according to embodiments of the present invention.

A novel linearization methodology for harmonic radar is presented in FIG. 4. The linearization circuit consists of a filter, a directional coupler, an amplitude modulator, a phase shifter, and a combiner (summation circuit). From FIG. 4, the power amplifier feeds Port A with both the desired frequency $f_0$ and the undesired harmonic. The transmit signal propagates through the coupler with minimal loss and arrives at the filter. The filter is designed to pass the desired frequency and to reject the amplifier-generated harmonic (in the forward direction) according to its two-port transmission characteristic $|S_{21}|$. At the output of the filter, the transmitted signal is partially linearized, but still contains enough of the system-generated harmonic to mask the target response.

RF filters are generally designed to reflect (and not attenuate) the frequencies that they reject. Thus, the rejected harmonic reflects from the filter and propagates in the reverse direction, back through the directional coupler. The coupler captures some of the reverse-traveling wave (typically 10 dB or 20 dB) and sends the signal to a variable attenuator and phase shifters. This pair modifies the harmonic to a wave that is equal in magnitude and opposite in phase to the harmonic output from the filter. We will call this the cancellation path. When the filtered output is summed with the cancellation path the second harmonic cancels and the signal, $P_{trans}$, is fully linearized.

Automating Tuning of FFFR Circuit

As stated in the previous sections, in order to cancel the second harmonic the phase difference between the filter and cancellation paths needs to be exactly 180 degrees at the desired frequency. The magnitude of the two signals also needs to be equal at the time on recombination. Thus, it is natural to break up the tuning process into tuning the phase to be 180 degrees out of phase and tuning the magnitude to be the same.

Tuning Phase

Figure 5:
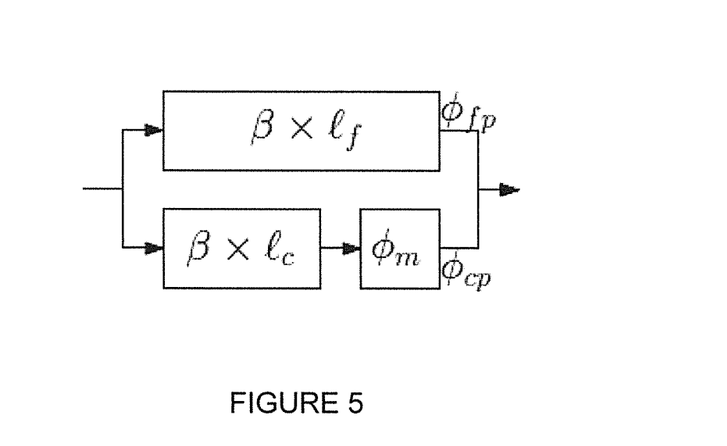
FIG. 5 is a simple illustration showing how the phase changes through the different paths in a feed-forward filter reflection system.

A simple illustration of how the phase changes through the different paths is shown in FIG. 5. In FIG. 5, $R_f$ and $R_c$ are the electrical lengths of the filter and cancellation paths respectively, $\beta$ is the wave number, $\varphi_m$ is the phase change caused by the vector modulator (VM) and $\varphi f_p$ and $\varphi_{cp}$ are the total changes is phase in the filter path and cancellation path, respectively. To stay general, the phase difference between the cancellation path ($\varphi_{cp}$) and filter path ($\varphi f_p$) could be $180° + n \times 360°$, where n=0, 1, 2. This condition for cancellation can be written in radians as shown in Eq. 2. Also, $\varphi f_p$ and $\varphi_{cp}$ are defined in Eq. 3.

$$\varphi_{fp} - \varphi_{cp} = (2n-1)\pi, n=1,2,3 \quad (2)$$

$$\varphi_{fp} = \beta R_f, \varphi_{cp} = \beta R_c + \varphi_m \quad (3)$$

Plugging Eq. 3 into Eq. 2, we obtain $$\beta R_f - (\beta R_c + \varphi_m) = (2n-1)\pi \quad (4)$$

Rearranging terms in Eq. 4, it is easy to get the expression in Eq. 5

$$\beta(R_f - R_c) - \varphi_m = (2n-1)\pi \quad (5)$$

The substitutions made to get from Eq. 4 to Eq. 5 assume that the speed of the wave in both the filter path and cancellation path are the same. This is not an unrealistic assumption when tuning out single frequencies at a time, but if tuning is to be done across a wide bandwidth at the same time, dispersion needs to be taken into account.

To further reduce the condition for cancellation two addition substitutions are made, namely, $R_f - R_c = \Delta R$ and $\beta = 2\pi f/v$, where v is the speed of the wave inside the circuit. After making the substitutions and solving for f, the tuning frequency, the tuning expression can be expressed as in Eq. 6.

$$f = \frac{v}{2\pi \Delta R} \varphi_m + \frac{(2n-1)v}{2\Delta R} \quad (6)$$

Tuning the Magnitude

Figure 6:
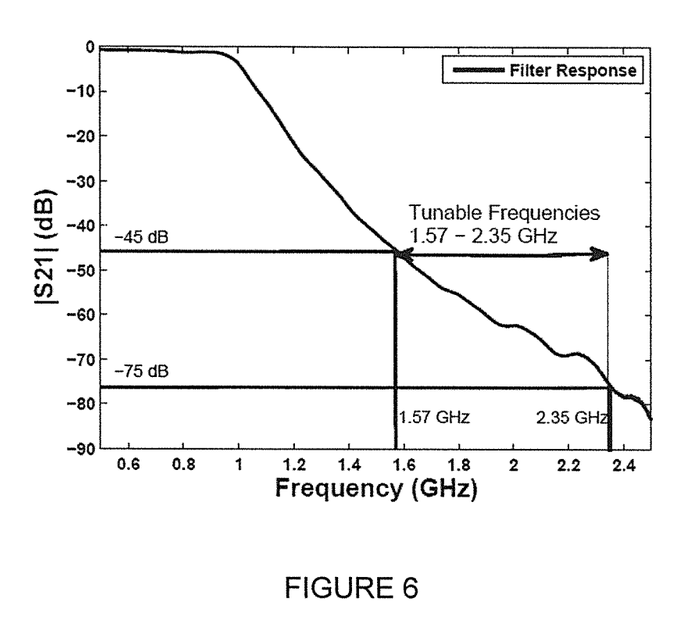
FIG. 6 shows filter response of the feed-forward filter reflection in one exemplary embodiment.

The above equations show how changing the vector modulator phase changes the cancellation frequency. The other half of the tuning process is matching the loss through the filter and cancellation paths. The loss through the filter path is set by the LPF. The loss through the filter path can be expresses as the transfer function of the filter, or $|S'_{21}|$. The loss through the cancellation path is set by the two couplers and the loss through the VM. Each coupler has 20 dB of loss and the VM can change its loss from −5 dB to −35 dB. Therefore, the total loss through the cancellation path is between 45 and 75 dB. This means that the cancellation path can cancel any frequency that has between 45 and 75 dB of loss through the filter path. For the Mini-Circuits NLP-1000+ filter, this means that any frequency between 1.57 and 2.35 GHz can be canceled, as seen in FIG. 6.

Figure 10:
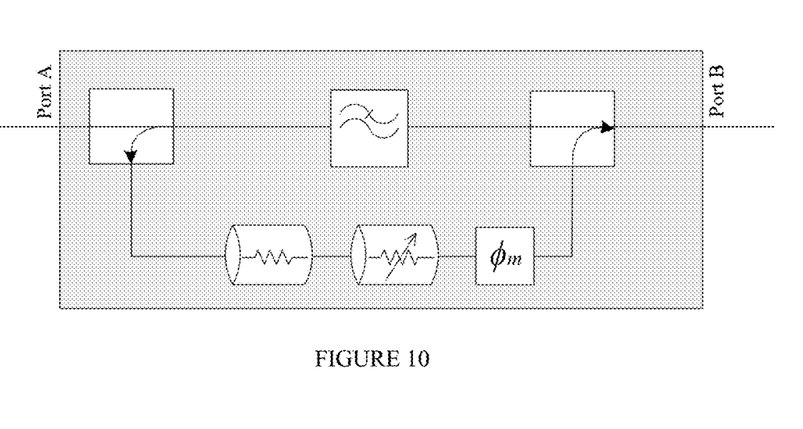
FIGS. 10-12 show alternative feed-forward filter reflection implementations according to embodiments.
Figures 11, 12:
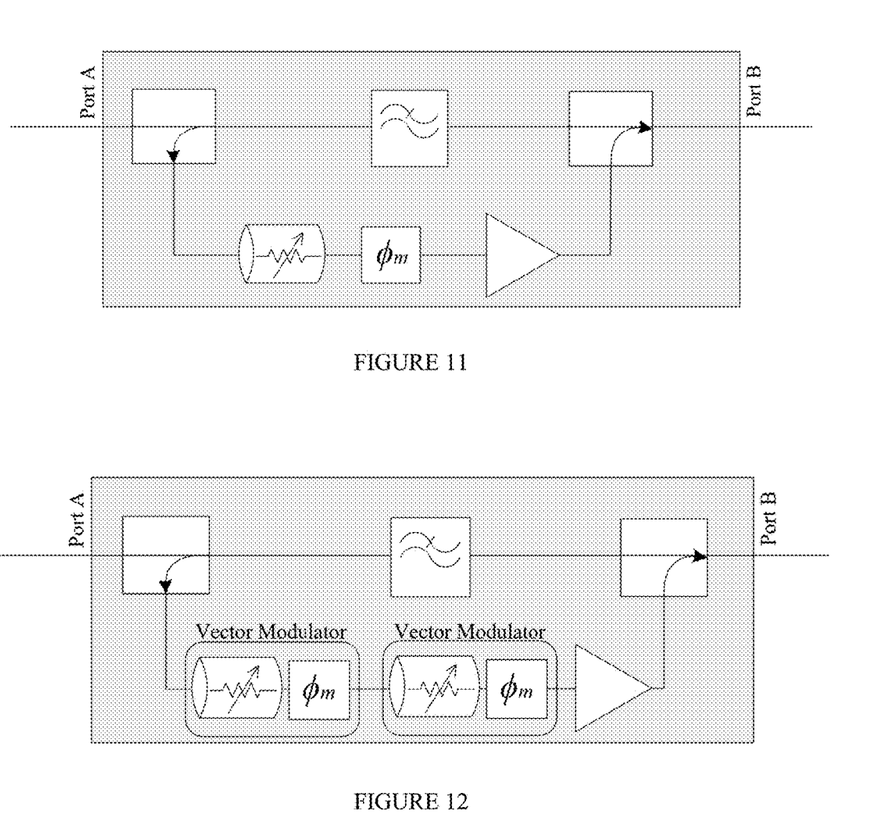

If different frequencies need to be canceled, a fixed attenuator can be added to shift the cancellation frequency higher. (See e.g., FIG. 10). To tune out lower frequencies, less attenuation is needed so different couplers can be used, say −10 dB in place of the −20 dB. An amplifier can also be added to cancellation path to cancel lower frequencies that have less loss through the filter. (See e.g., FIG. 11). To improve the frequency tuning range on the high and low side, two VMs can be used in addition to an amplifier. (See e.g., FIG. 12) For our application, canceling frequencies between 1.6-2.0 GHz, one VM and no amplifiers are needed.

Implementation of Automated FFFR Tuning

The VM is controlled with the analog outputs on a NI DAQ data acquisition system using LabView and an Agilent PNA N5225A network analyzer is also controlled with LabView. The PNA is setup in $S_{21}$ mode and is connected to Ports A and B of the FFFR network, shown in FIG. 4. The PNA provides the feedback about how well the FFFR is canceling the desired frequency. The frequency required to cancel is inputted into LabView and the program first sweeps the phase of the VM. Sweeping the phase corresponds to changing the frequency of the notch created from the cancellation, from Eq. 6. Data from the PNA at the desired frequency are stored as the phase of the VM is swept. The data are stored as $S_{21}$ at each frequency vs VM phase. The minimum of the $S_{21}$ data is found. The phase that provides the minimum $S_{21}$ corresponds to the phase required to cancel the desired frequency.

Once the desired phase is found, the magnitude of the VM is swept. $S_{21}$ measurements are taken at the desired frequency as the VM sweeps magnitude. A plot of $S_{21}$ vs. VM magnitude is generated and the minimum is found. The VM magnitude of the minimum of the $S_{21}$ corresponds to the amount of attenuation needed to match the filter path. The sweeping of the magnitude and phase is done several times to achieve an $S_{21}$ value of less than 110 dB.

With no a priori knowledge of the magnitude or phase required to cancel the desired frequency this technique will go through 100-120 combinations of magnitude and phase before reaching the −110 dB $S_{21}$ desired cancellation. However, with knowledge of the required magnitude and phase, only 10-20 combinations are needed. It would be apparent to a person of skill in the art that optimization techniques can be implemented to reduce the number of iterations.

Measurements and Results

The implementation of the automated FFFR technique has been chosen for a harmonic radar to operate over the frequency range of 800-1,000 MHz. Therefore, the second harmonic will be generated from 1,600-2,000 MHz. For this reason the frequency range chosen for the frequency rejection is 1,600-2,000 MHz, with the LPF passing DC—1,000 MHz.

Figure 7:
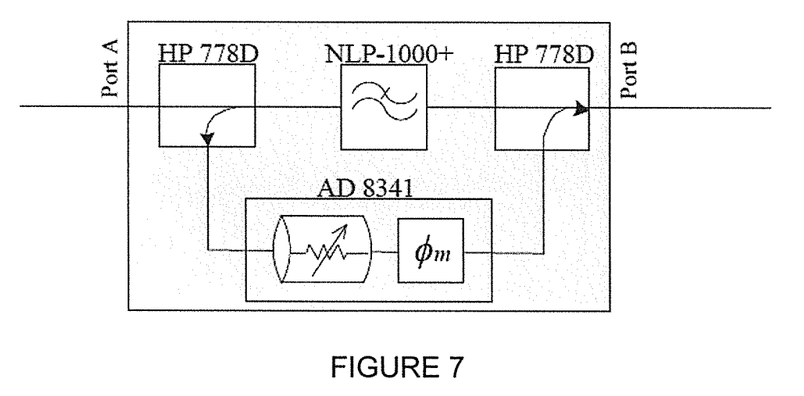
FIG. 7 shows a feed-forward filter reflection implementation according to an exemplary embodiment.

The FFFR technique has been implemented using the RF circuit shown in FIG. 7. The directional coupler is the HP 778D, the variable attenuator and phase shifter are implemented with an Analog Devices (AD8341), Vector Modulator (VM), and another combiner HP 778D. The lowpass filter tested is the Mini-Circuits NLP-1000+.

Figure 8:
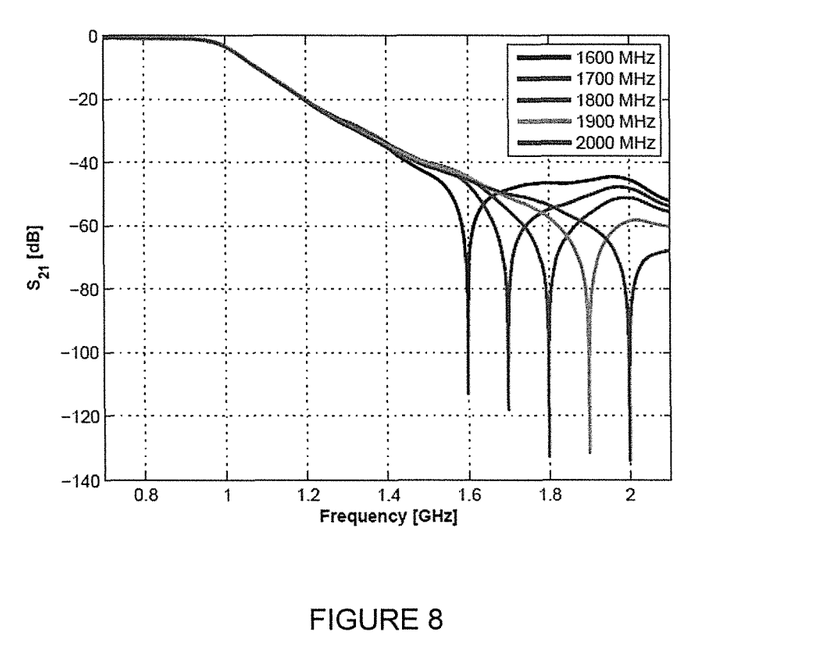
FIG. 8 is a plot of frequency response of feed-forward filter reflection tuning out various frequencies.

The frequency response from Port A to Port B is measured with the VM tuned to cancel 5 frequencies, namely, 1.6, 1.7, 1.8, 1.9 and 2.0 GHz. As stated, this frequency range corresponds to the second harmonic that would be generated by a power amplifier transmitting between 800 and 1,000 MHz. The Agilent PNA is used to collect the frequency response, $S_{21}$. FIG. 8 shows the results.

Each trace corresponds to the FFFR tuning out a different frequency. In addition to storing the $S_{21}$ data from each tuning, the magnitude and phase settings of the VM are recorded. They are given in Table I.

TABLE I

Vector Modulator (VM) settings for canceling 1.6, 1.7, 1.8, 1.9 and 2.0 GHz

| Tuning Frequency (GHz) | Magnitude of VM | Phase of VM (Rad./π) |
|---|---|---|
| 1.6 | 0.72 | 1.55 |
| 1.7 | 0.44 | 1.90 |
| 1.8 | 0.33 | 2.16 |
| 1.9 | 0.16 | 2.42 |
| 2.0 | 0.085 | 2.86 |

Figure 9:
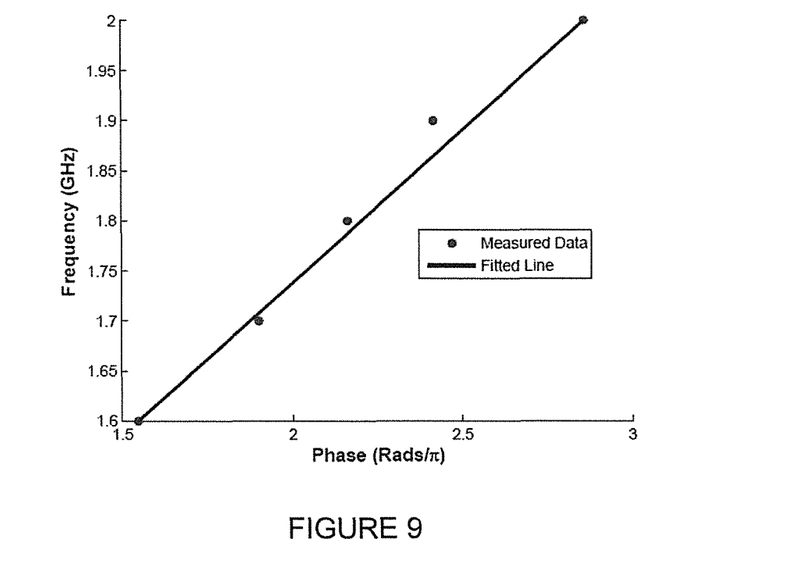
FIG. 9 is a plot of measured optimum vector modulation (VM) phase data along with a best-fit line.

In an effort to speed up the automation process, the VM phase is compared to the tuning frequency and a line of best fit is obtained. This line of best fit relates the desired frequency to cancel to the required VM phase setting. This equation follows from Eq. 6. A plot with the measured data and the fitted line is shown in FIG. 9.

The equation for the fitted line is:

$$f(\text{MHz}) = 304.2\left(\frac{\text{MHz}}{\text{rad}}\right) \times \varphi_m(\text{rad}) + 1{,}129(\text{MHz}) \qquad (7)$$

Equation 7 was developed from the cancellation condition, Eq. 3, and directly yields the cancellation frequency for a given phase. A more practical manipulation of the equations yields the required tuning phase to cancel a desired frequency, as given in Eq. 8.

$$\varphi_m(\text{rad}) = \frac{f(\text{MHz}) - 1{,}129(\text{MHz})}{304.2(\text{MHz/rad})} \qquad (8)$$

Using Eq. 8, the required VM phase to cancel any frequency within the tunable range can be found. The value of VM phase can only serve as a starting point for tuning. If high cancellation is required, 10-15 iterations of tuning are still required. The reason for this is because if 100 dB of cancellation is required, the phase difference between the two signal needs to be within 0.1% of 180° and this level of accuracy is not obtainable with a fitted line. This is because the tuning process is very sensitive to small changes in cable length and temperature.

Figure 13:
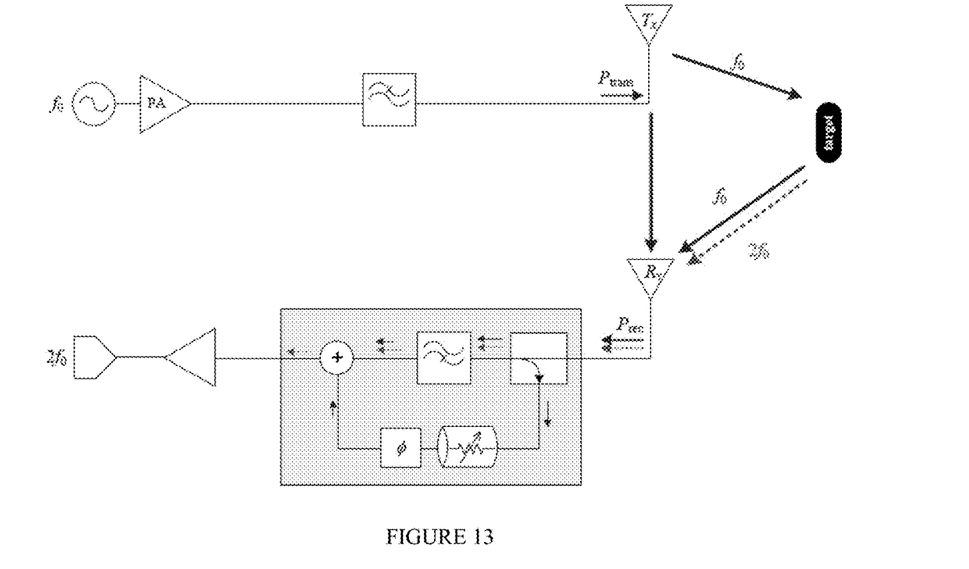
FIGS. 13 and 14 show schematics harmonic radars with linearization by feed-forward filter reflection applied to the receiver side and both the transmitter and receiver sides according embodiments.
Figure 14:
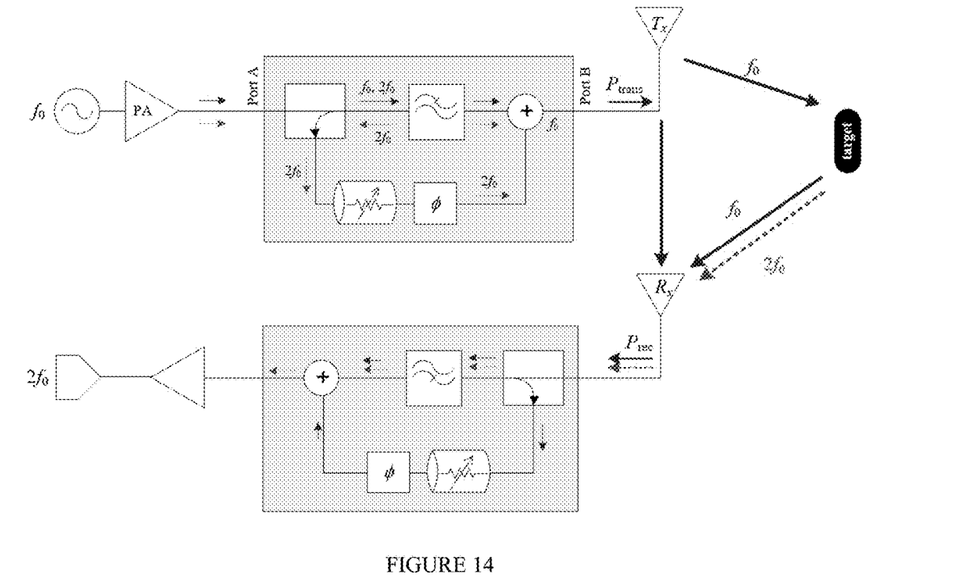

While the emphasis herein has been placed on the transmitter side of the system, the FFFR technique can also be applied to the receive side of a harmonic radar. (See e.g., FIG. 13 (applied to the receiver side) and FIG. 14 (applied to both the transmitter and receiver sides). A high pass filter can be used to pass the harmonic and reject the fundamental. The fundamental frequency signal can then be coupled off using the same couplers. The magnitude and phase can be shifted using similar vector modulators, depending on the frequency, and the same cancellation should be achievable.

Aspects related to the invention have been previously disclosed in: (1) K. A. Gallagher, G. J. Mazzara, K. D. Sherbondy, R. M. Narayanan, and A. F. Martone, "Automated cancellation of harmonics using feed-forward filter reflection for radar transmitter linearization," Proceedings of the SPIE, Vol. 9077, pp. 90770U(1-10), May 2014 (presented at conference in Baltimore, Md. on May 5, 2014; published in the SPIE proceedings on May 29, 2014); and (2) K. Gallagher, R. Narayanan, G. Mazzara, K. Sherbondy, "Linearization of a harmonic radar transmitter by feedforward filter reflection," *Proceedings of the IEEE Radar Conference*, May 2014. (presented in Cincinnati, Ohio on May 20, 2014), both disclosures are herein incorporated by reference in their entireties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A system for linearizing a harmonic radar transmitter including a power amplifier outputting a transmit signal with a transmit frequency and an amplifier-generated harmonic, the system comprising:
   a directional coupler in series with an RF filter and a signal combiner;
   wherein the transmit signal from the power amplifier passes through the directional coupler to the RF filter;
   the RF filter configured to reject the amplifier-generated harmonic, such that the amplifier-generated harmonic is reflected back through the directional coupler in the reverse direction, and the filter passes the transmit frequency and a system-generated harmonic to the signal combiner;
   wherein the reflected amplifier-generated harmonic from the directional coupler passes through a variable attenuator and a phase shifter, the variable attenuator configured to reduce the magnitude of the reflected amplifier-generated harmonic to match that of the system-generated harmonic, and the phase shifter configured to cause the reflected amplifier-generated harmonic to be 180 degrees out of phase with the system-generated harmonic, such that the amplifier-generated and system-generated harmonics cancel out at the combiner; and
   the combiner outputs the transmit frequency without the harmonic to a transmit antenna.

2. The system of claim 1, wherein the variable attenuator and phase shifter are automatically adjusted so that the amplifier-generated and system-generated harmonics cancel out at the combiner.

3. The system of claim 1, further comprising a radar receiver including a receive antenna coupled to a filter configured to reject the transmit frequency and pass the harmonic.

4. The system of claim 1, further including a fixed attenuator configured to shift the reduced magnitude, phase-shifted, reflected amplifier-generated harmonic to cancel different frequencies.

5. The system of claim 1, further including one or more additional directional couplers configured to tune out lower frequencies requiring less attenuation.

6. The system of claim 1, further including an amplifier in series with the phase shifter configured to cancel lower frequencies having less loss through the filter.

7. The system of claim 1, further including two vector modulators and an amplifier configured to improve the frequency tuning range on the high and low sides.

8. A system for linearizing a harmonic radar receiver, the system comprising:
   an antenna configured to receive a fundamental transmit frequency and a desired harmonic;
   a high pass filter coupled to the antenna that is configured to pass the desired harmonic and reject the fundamental transmit frequency;
   a directional coupler configured to receive the rejected fundamental transmit frequency and redirect it to a variable attenuator and a phase shifter which modifies the magnitude of, and shifts the phase of, the rejected fundamental transmit frequency; and
   one or more vector modulators configured to control the variable attenuator and a phase shifter to cancel the fundamental transmit frequency via summation with the magnitude-modified, phase-shifted rejected fundamental frequency.

9. An RF circuit comprising;
   a first path between an input and an output which includes a lowpass RF filter that is configured to pass a fundamental frequency of a RF signal in a forward direction and reject a harmonic of the RF signal in a reverse direction;
   a directional coupler in the first path configured to receive the rejected harmonic and redirect it along a second path between the input and the output which includes a variable attenuator and a phase shifter which are configured to modify the magnitude and phase of the rejected harmonic to be equal in magnitude and opposite in phase to the a residual harmonic that passes through the RF filter;
   a signal combiner in the first path which combines the fundamental frequency and the residual harmonic passing in the forward direction in the first path with the modified rejected harmonic in the second path so that the residual harmonic and modified rejected harmonic cancel each other out.

10. The circuit of claim 9, wherein the signal combiner comprises an additional directional coupler or a summation circuit.

11. The system of claim 9, further comprising one or more vector modulators configured to control the variable attenuator and a phase shifter.

12. A RF system comprising:
   a transmitter; and
   a receiver,
   wherein the transmitter, the receiver, or both the transmitter and the receiver include the RF circuit of claim 9.

13. The system of claim 1, wherein the system-generated harmonic comprises a residual of the amplifier-generated harmonic which passes through the RF filter.

14. The system of claim 1, wherein the RF filter is a lowpass filter or a bandstop filter.

* * * * *